United States Patent
Berlemont et al.

(12)

(10) Patent No.: US 6,794,430 B2
(45) Date of Patent: Sep. 21, 2004

(54) POLYMER GRANULES WITH ANISOTROPIC COLORING, THE MANUFACTURING THEREOF AND THE USE THEREOF TO PRODUCE COATINGS AND MOULDED ARTICLES

(75) Inventors: Jacques Berlemont, Paris (FR); Xavier Poupon, Paris (FR)

(73) Assignee: Etablissements Boulenger, Paris (FR)

( * ) Notice: Subject to any disclaimer, the term of this patent is extended or adjusted under 35 U.S.C. 154(b) by 326 days.

(21) Appl. No.: 10/007,697

(22) Filed: Dec. 10, 2001

(65) Prior Publication Data

US 2003/0078321 A1 Apr. 24, 2003

(30) Foreign Application Priority Data

Oct. 24, 2001 (FR) .............................. 01 13732

(51) Int. Cl.⁷ ................. C08J 3/22; C08J 3/20
(52) U.S. Cl. ............ 523/351; 523/346; 523/348
(58) Field of Search ............... 523/346, 348, 523/351

(56) References Cited

U.S. PATENT DOCUMENTS

| | | | |
|---|---|---|---|
| 2,314,062 | A | 3/1943 | Alvey et al. |
| 2,495,241 | A | 1/1950 | Eaby |
| 3,529,325 | A | 9/1970 | Duggins |
| 3,570,056 | A | 3/1971 | Hall et al. |
| 5,962,557 | A | * 10/1999 | Weaver et al. ............... 524/35 |
| 6,017,984 | A | * 1/2000 | Schonfeld et al. ........... 524/190 |

FOREIGN PATENT DOCUMENTS

| | | |
|---|---|---|
| FR | 1 082 699 | 12/1954 |
| FR | 1 604 220 | 10/1971 |
| FR | 2 268 621 | 11/1975 |
| FR | 2 541 296 | 8/1984 |

OTHER PUBLICATIONS

Patent Abstract of Japan vol. 011, No. 196, Jun. 24, 1987. JP62 019409, Fujikura Ltd.
Patent Abstract of Japan vol. 008, No. 120, Jun. 6, 1984, JP 59 024627, Toyo Linoleum Mfg. Co. Ltd.
Bulletin des Avis Technique 12/97–1125 (Sep. 1998), Haltopex Haltopex Polyvalent Sportside.
Bulletin des Avis Technique 12/98–1143 (Jan.–Feb. 1999), Cibelastic.

* cited by examiner

*Primary Examiner*—Tae H. Yoon
(74) *Attorney, Agent, or Firm*—Jacobson Holman PLLC

(57) ABSTRACT

The process for manufacturing polymer granules includes the operations of mixing a base polymer and additives, with a specific step of adding shading colorant to the cured polymer mixture followed by a step of carrying out an incomplete homogenization of the colorant with the polymer mixture, the duration of which is fixed according to desired colouring anisotropy characteristics, the process providing granules having such an anisotropy which can be used for the manufacturing of coatings and moulded articles.

14 Claims, 2 Drawing Sheets

US 6,794,430 B2

POLYMER GRANULES WITH ANISOTROPIC COLORING, THE MANUFACTURING THEREOF AND THE USE THEREOF TO PRODUCE COATINGS AND MOULDED ARTICLES

BACKGROUND OF THE INVENTION

1. Field of the Invention

The present invention relates to a process for preparing polymer based granules each presenting a shaded appearance of anisotropic colouring. A "shaded appearance of anisotropic colouring" should read as meaning random variations of colouring observable in all directions from any given point in the body of the granule. The present invention also relates to polymer granules presenting such a shaded appearance of anisotropic colouring. Such granules can, in particular, be obtained through the use of said process. The present invention also relates to the applications of these granules, in particular for producing surface coatings.

2. Prior Art

Various methods are known for producing cast surface coatings based on polymer granules incorporated in a resin binder. One can thus obtain a cast surface coating that is essentially inalterable under usual conditions of wear, and the visual appearance of which is of the mosaic, single colour or multicoloured type.

By way of example can be mentioned patent application FR 2 541 296 which describes such cast coatings based on rubber granules that can be coloured and which are spread in an entirely random fashion and inserted into a binder.

For this purpose, processes for manufacturing polymer based granules used, for example, to manufacture cast coatings, are known and usually include steps of mixing a base polymer with additives, of extrusion, of calendering or some other shaping, of vulcanization and of cooling of the mixture before its grinding. Furthermore, the granules are usually coloured by adding a colorant or a mixture of colorants. The aim of the usual applications is to obtain granules of a homogenous colour. Multi-coloured surface coatings are, indeed, obtained by mixing several colours, or shades of colour, of granules obtained during successive manufacturing operations.

Thus, all the granules of each manufacturing operation are identical, with an isotropic colouring, that is to say homogenous in the body of each granule, and the coatings that can be obtained with these granules have the drawback of having an artificial visual appearance, because being uniform, in comparison with natural solid materials such as, for example, marble or stones or the like, whether crushed or not.

Moreover, polymer based in-works manufactured materials, for example polymer surface coatings presenting shades of colouring are known in the prior art. However, such shades of colouring are obtained through the dispersion of an added layer of colorant on the surface or by encrusting coloured materials. Such manufactured materials are made in their final form by equipment conferring thereupon the desired specific forms, for example slabs or tiles of varying size and thickness, or widths. However, this aforementioned technique is confined to materials manufactured according to the desired final form. Furthermore, in the case of such manufactured materials, there can be no question of sanding or buffing to renovate the appearance thereof.

By contrast with these manufactured materials, there is a growing need in this field for obtaining surface coatings cast in situ, that is to say prepared directly on the work site, based on polymer granules combining mechanical characteristics that are satisfactory in various fields of application, in particular for pedestrian use, and a visual appearance presenting a certain variety of colours or shades of colouring that are anisotropic in the body of the granules, hence of the coating obtained from such granules.

The present invention enables to achieve this result through a particularly simple and inexpensive process.

SUMMARY OF THE INVENTION

The process for manufacturing polymer granules includes the operations of mixing a base polymer and additives, with a specific step of adding shading colorant to the polymer mixture followed by a step of carrying out an incomplete homogenization of the colorant with the polymer mixture, the duration of which is fixed according to desired colouring anisotropy characteristics, the process providing granules having such an anisotropy which can be used for the manufacturing of coatings and moulded articles.

DETAILED DESCRIPTION OF THE INVENTION

Figure 1:
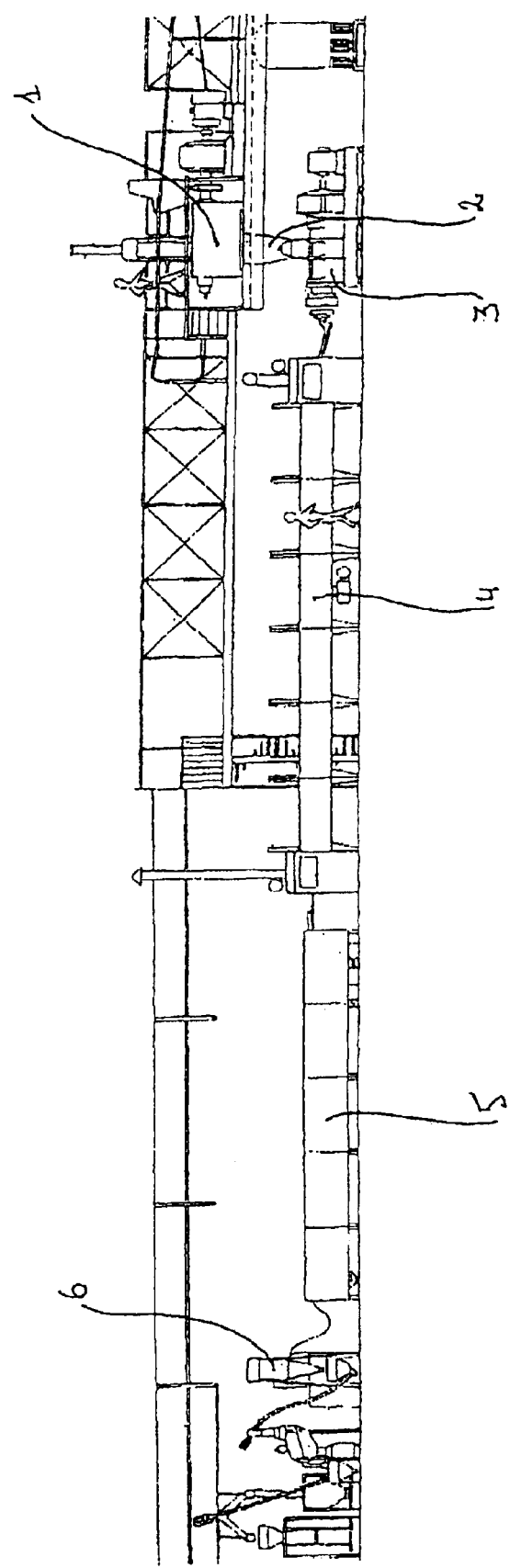
FIG. 1 is a side view of the continuous process for obtaining granules according to the invention.

For this purpose, the invention provides a process for manufacturing polymer granules having an anisotropic colouring, including the successive operations of mixing a base polymer and additives, and extruding and grinding the cured polymer mixture to form granules, characterized in that it includes a specific step of adding a shading colorant to the mixture of the base polymer and of the additives, followed by a step of carrying out an incomplete homogenization of said shading colorant in said mixture, the duration of which is fixed according to desired colouring anisotropy characteristics. This duration, which is determined by prior tests, is referred to as "mixture colouring duration".

Thus, the process according to the invention enables to provide granules designed to produce a coating having shades of colour that are non-homogeneous from one granule to another and, in general, within each individual granule. This obviates the need to use several batches of granules of different colors or shades. This enables, above all, to obtain an aesthetic effect that is much closer to the one obtained with natural materials such as marbles or other stones, and hence to banish the artificial appearance associated with this type of synthetic polymer coating. On the other hand, the anisotropic colouring present in the body of the polymer granule enables to carry out successive operations of renovation by sanding or buffing, without any risk of colouring disappearing, as this colouring is produced within the body of each granule, and not in an added surface layer.

The invention thus consists in adding the shading colorant at a step in the process so that it is not homogeneously mixed with the polymer mixture. In particular, if the time taken to mix the other components of the polymer mixture is greater than the colouring duration of the polymer mixture, it is excluded to add the shading colorant at the start of the mixing step. This shading colorant must then be added after the start of this period of components mixing, that is to say during this one. There can also be foreseen a specific shading colorant mixing operation after the end of the primary constituents mixing step.

The different components that go into the preparation of the polymer mixture are, for example, introduced into a mixer, with the exception of the colorant or colorants serving to carry out the anisotropic colouring according to the invention, hereinafter referred to as shading colorant(s), with this term being used to cover either a single colorant or a mixture of several colorants. These components include one or more base polymers to which are added habitual additives such as fillers, oils or plasticizers, vulcanizing agents. If need be, basic colouring products can be added, in proportions known to a person skilled in the art, these being completely mixed to give the polymer mixture a colour or tint, with which the colour(s) or tint(s) of the shading colorant will subsequently be combined. The base polymers are advantageously selected from the polymers, or their derivatives, of the following types: rubber, styrene-butadiene rubber (SBR), ethylene-propylenediene monomere(EPDM), elastomers or thermoplastic synthetic high polymers. The homogeneous mixture of these components is hereinafter referred to as "primary polymer mixture".

According to a preferred embodiment of the process according to the invention, the shading colorant leading to the desired effect is added to the primary polymer mixture before complete homogenization of the latter, that is to say that the components of this mixture are first of all brought together, and then this mixture is homogenized and, before this homogenization is complete, the shading colorant is added to the mixture. Homogenization is then continued in such a way as to be complete in the case of the components of the primary mixture but incomplete in that of the shading colorant added subsequently. It is, for example, continued for a duration determined in order to maintain a certain colour anisotropy, that is to say to obtain the desired colouring anisotropy effects. In other words, this duration is limited to a maximum threshold corresponding to the desired degree of anisotropy.

According to another embodiment of the process according to the invention, the shading colorant is added after total homogenization of the primary polymer mixture. An additional mixing step is then carried out in order to obtain an incomplete homogenization of the shading colorant corresponding to the desired colouring anisotropy.

According to one preferred embodiment of the process according to the invention, the primary polymer mixture is prepared in an internal mixer, hot, preferably in a final temperature range for the homogenization operation of between 100° C. and 150° C. The shading colorant is introduced into the mixer when the temperature is at least 100° C., and preferably between 120° C. and 130° C., and/or when the mixing operation has lasted only a fraction of the total time needed to obtain the satisfactory homogenization of the primary mixture, this fraction being greater than 75% of this time and preferably greater than 90%.

The colorant used can be, for example, a colorant usually used in the technical field of the invention such as organic pigments or metallic oxides.

When the mixing time necessary to obtain the homogeneity of the primary polymer mixture has elapsed, the anisotropic colouring mixture is discharged from the mixer into a shredder, which shredder feeds an extruder. The extruder produces a plastic strip which is then subjected to a vulcanization operation by means such as hot air, salt bath or microwaves. The vulcanization temperature will be chosen according to the nature of the polymer mixture, to the length of the vulcanizing tunnel and to the nature of the vulcanizing agents, that is to say the vulcanization initiators and accelerators, and, preferably, it will be between approximately 200° C. and approximately 280° C. The polymer strip is then cooled down to ambient temperature by usual means such as water or air.

The subsequent operation of the process consists in carrying out a grinding of the polymer strip. This operation leads to granules with varying shades of colour. The size of these granules will be chosen according to the nature of their future use. These granules are then mixed together to obtain a homogeneous whole, for example in a mixer of the concrete mixer drum type or a troughs mixer.

According to other embodiments of the process according to the invention, the primary polymer mixture can be prepared in any suitable type of mixer, and, in particular, a roll mixer, the shading colorant mixture can be carried out in the equipment producing the primary polymer mixture or in a specific equipment, the final mixture can be shaped, prior to the vulcanizing operation, by using any suitable means, such as an extruder, a rolling machine or a calendering machine, when granules presenting anisotropic colouring shades are manufactured from a thermoplastic base polymer, for example of the PVC or SBS type, a primary polymer mixture, namely a thermoplastic base polymer and additives, commercially available, can also be used, which enables to dispense with the mixing operation enabling obtention of the primary polymer mixture. Furthermore, with thermoplastic polymers, the vulcanization operation is no longer required, and addition of the shading colorant to the primary polymer mixture can be carried out during extrusion, for example using an extruder equipped with a device enabling its introduction into the appropriate area, depending on the desired anisotropic colouring effect.

Moreover, the addition of the shading colorant can, in the case of certain types of colouring anisotropy, and depending on the characteristics of the equipment used for the shaping prior to vulcanization, be carried out directly at the feed input of said shaping equipment.

These successive operations of the process for manufacturing the polymer type granules having anisotropic colouring shades are thus implemented on a continuous production line (FIG. 1). This thus permits control, first of all, over the mixing of the different constituents to achieve an adequate homogenization of the base polymer with the various additives, and then of the various physical parameters such as temperature and the mixing, extrusion, vulcanization and grinding times.

According to one alternative embodiment of the process according to the invention, the operations for manufacturing the granules can be carried out batchwise. These operations essentially reproduce those described earlier and also enable the manufacturing of granules having anisotropic colouring according to the invention. However, implementation of the process involves certain specific variants, as follows:

The final mixture, having a shaded appearance of anisotropic colouring is introduced into a roll mixer or into a calendering machine in order to obtain a sheet of the desired thickness, prior to the vulcanizing operation, according to another arrangement, the shading colorant is not integrated into the final mixture but is introduced at the rolls of the mixer or at the calender. Apart from the shading colorant, the vulcanizing agents can also be added at this stage. This then enables a possible storage of the polymer without any risk of incipient vulcanization, the vulcanizing operation is carried out in an autoclave oven at a temperature preferably between approximately 200° C. and approximately 280° C.

One of the advantages of batchwise implementation of the process is that it is possible to have for this purpose a simple equipment that can be adapted to the addition of the shading colorant enabling the desired anisotropy of colouring to be obtained for the granules finally produced.

Although it is advantageous to use an appropriate equipment for mass production, the different stages in the process according to the invention do not exclude manual implementation.

A further aspect of the invention relates to polymer granules each one having a shaded appearance of anisotropic colouring that is more or less marked. The visual appearance of each granule varies according to its own colouring shades and the polymer granules, as a whole, give a colouring shade effect that can, in particular, be rendered close to that produced by natural materials, marble or stones. It is possible, in particular, to accomplish this by using the process described above and, more particularly, by implementing the specific operation of addition of shading colorant according to the invention, whereof the conditions of mixing and, in particular, the duration, lead to the anisotropy of desired colouring. It is also possible, by using a mixture of shading colorants, to obtain for each granule a non-homogeneous multi-coloured shading appearance.

Figure 2:
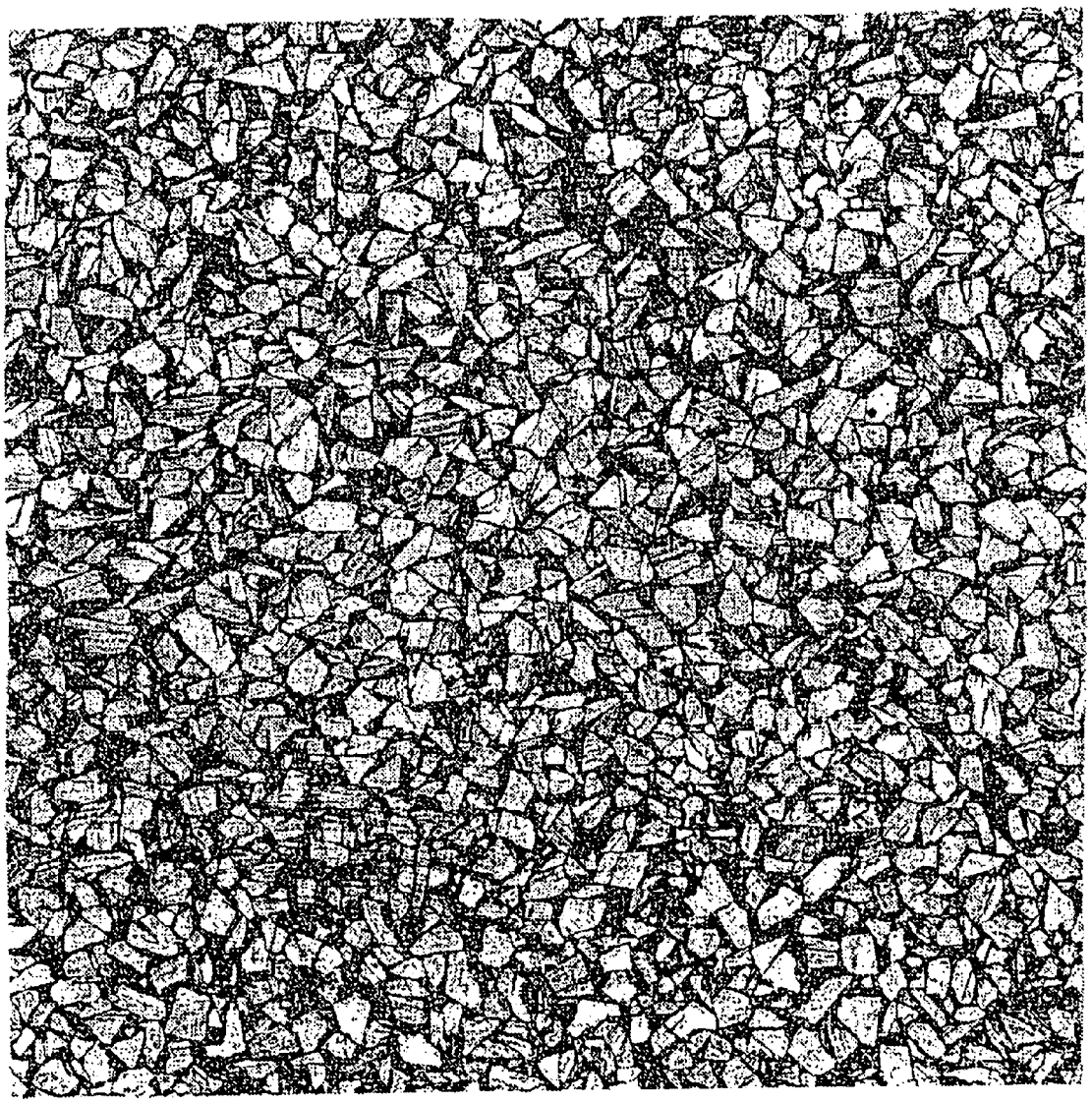
FIG. 2 is an example of a cast surface coating according to the invention.

The polymer granules according to the invention are advantageously intended for use in the manufacturing of surface coatings cast in situ, for example wall and floor coverings of the ®Haltopex type according to the process disclosed by the Applicant in French patent application FR 2 541 296 and of the ®Cibélastic type. These granules according to the invention can also be used to manufacture moulded articles such as those intended for use as complements to coatings, for example skirtings or beadings, but also as articles for bathrooms, etc. FIG. 2 presents an example of such a cast surface coating according to the invention. The carrying out and the technical characteristics of surface coatings obtained from granules according to the invention are described in Nos. 12/97-1125 (September 1998) and in No. 12/98-1143 (January–February 1999) of the Bulletin des Avis Techniques. (Bulletin of Technical Opinions). However, the granules according to the invention have a visual appearance comparable with that of natural solid materials, crushed or not, such as obtained, for example, by crushing marble or various other stones.

An example of implementation of the continuous process (FIG. 1) for obtaining granules according to the invention is given hereinafter.

EXAMPLE 17 kg of rubber and the additives, plasticizer (1 kg), fillers (37 kg), vulcanizing agents (2 kg) and a basic colorant (3 kg) are introduced into the internal mixer 1, having a capacity of 40 l. The homogeneous primary polymer mixture is obtained after a mixing time, including the feeding time, of between 300 and 400 s. When the temperature of the mixture has reached 130° C., 100 g of organic pigment based shading colorant are then added to the primary polymer mixture for a period of 20 s, enabling to obtain the anisotropic colouring of the primary polymer mixture. The primary polymer mixture having a non-homogeneous colouring is then discharged into shredder 2. Shredding is carried out for approximately 30 s and then the shredded mixture is supplied to extruder 3 which, after approximately 350 s, provides a plastic strip which is then processed in the hot air vulcanizer 4, the temperature of which is 280° C., for 600 s.

The polymer strip is cooled down to ambient temperature at the exit from the vulcanizer by passing along a conveyor belt 5 comprising a water cooling system, for a period of approximately 600 s. The polymer strip feeds grinder 6, which has a grinding capacity of approximately 10 kg/minute and the size of the majority of granules obtained is between about 3 and about 5 mm, depending on the size of the grinder screen. The granules are then mixed together in a troughs mixer to form a homogeneous whole.

What is claimed is:

1. A process for manufacturing polymer granules comprising the successive operations of mixing a base polymer and additives to form a polymer mixture shaping the polymer mixture, curing the polymer mixture, grinding the polymer mixture to form granules, and adding a shading colorant to the polymer mixture, followed by carrying out an incomplete homogenization of said shading colorant in said polymer mixture, the duration of which is fixed according to desired colouring anisotropy characteristics of the granules.

2. The process according to claim 1, wherein the shading colorant is added during the operation of mixing the base polymer and the additives, the operation of mixing the whole being continued for a time required for the polymer-additives mixture to be homogeneous and corresponding to a desired heterogeneity of the distribution of the shading colorant in the mixture.

3. The process according to claim 2, wherein the shading colorant is incorporated in an internal mixer brought to a temperature ranging from approximately 100° C. to approximately 150°.

4. The process according to claim 1, wherein the shading colorant is added subsequently to the operation of mixing the base polymer and the additives.

5. The process according to claim 1, wherein the different operations are carried out on a continuous production line.

6. The process according to claim 5, wherein the shading colorant is added at the time of an extrusion operation, an extruder carrying out incomplete homogenization of the shading colorant.

7. The process according to claim 1, wherein the different steps are carried out batchwise.

8. The process according to claim 7, wherein the shading colorant is added at rolls of a mixer or at a calendering machine.

9. The process according to claim 1, wherein the base polymer is selected from the group of polymers consisting of rubber, elastomer and thermoplastic synthetic high polymers.

10. The process according to claim 1, wherein the additives added to the base polymer include one or more colorants.

11. Polymer granules usable for the manufacturing of surface coatings or of moulded articles, comprising a plurality of granules, each granule presenting anisotropic shades of colouring.

12. A surface coating obtained by implementing granules according to claim 11.

13. Moulded articles obtained by implementing granules according to claim 11.

14. The process according to claim 1, wherein the base polymer is selected from the group consisting of styrene-butadiene rubber, and ethylene-propylene-diene rubber.

* * * * *